A. LEVEDAHL.
BICYCLE FRAME.
APPLICATION FILED DEC. 30, 1907. RENEWED DEC. 12, 1908.
913,961.
Patented Mar. 2, 1909.
2 SHEETS—SHEET 2.
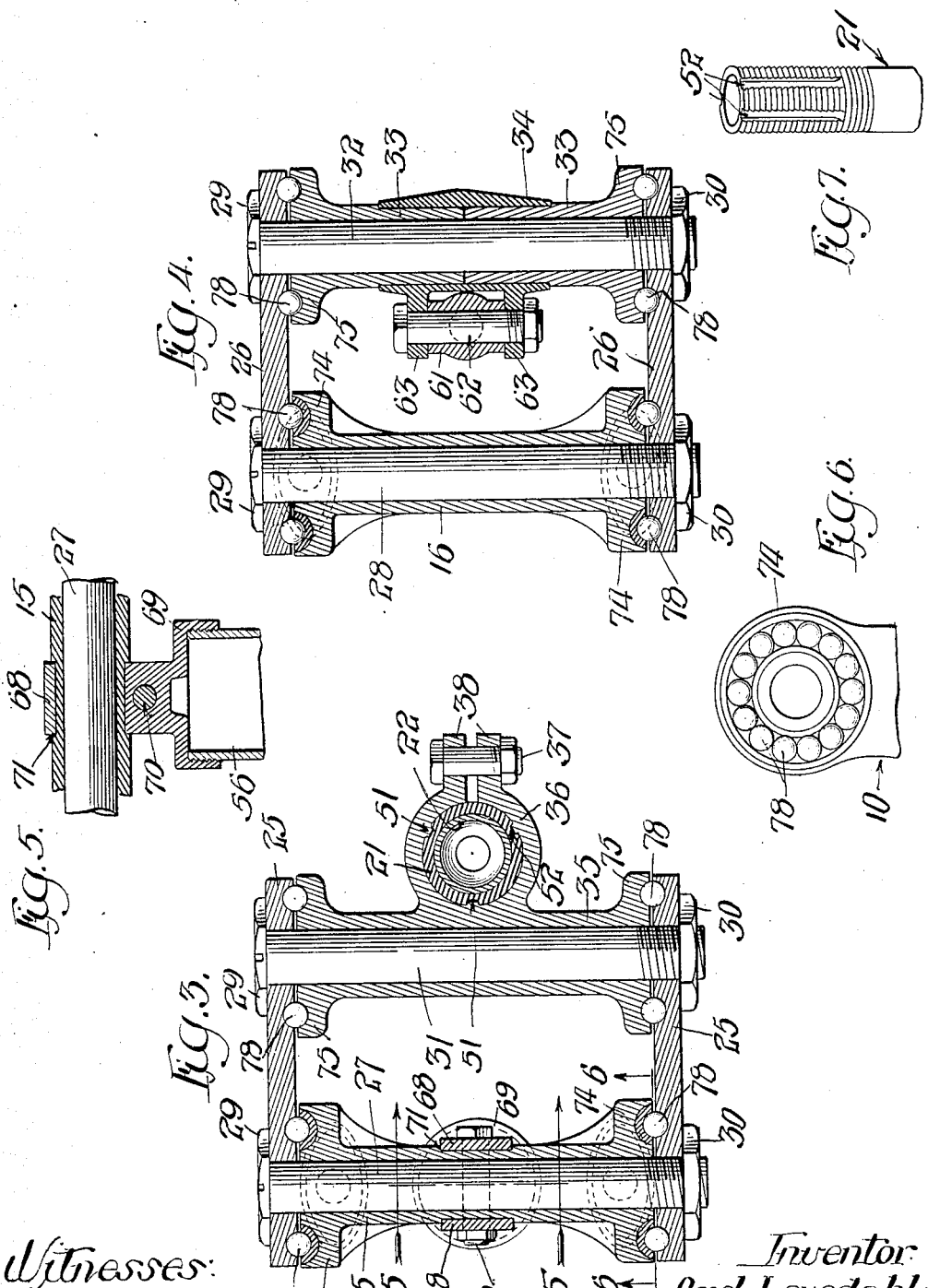

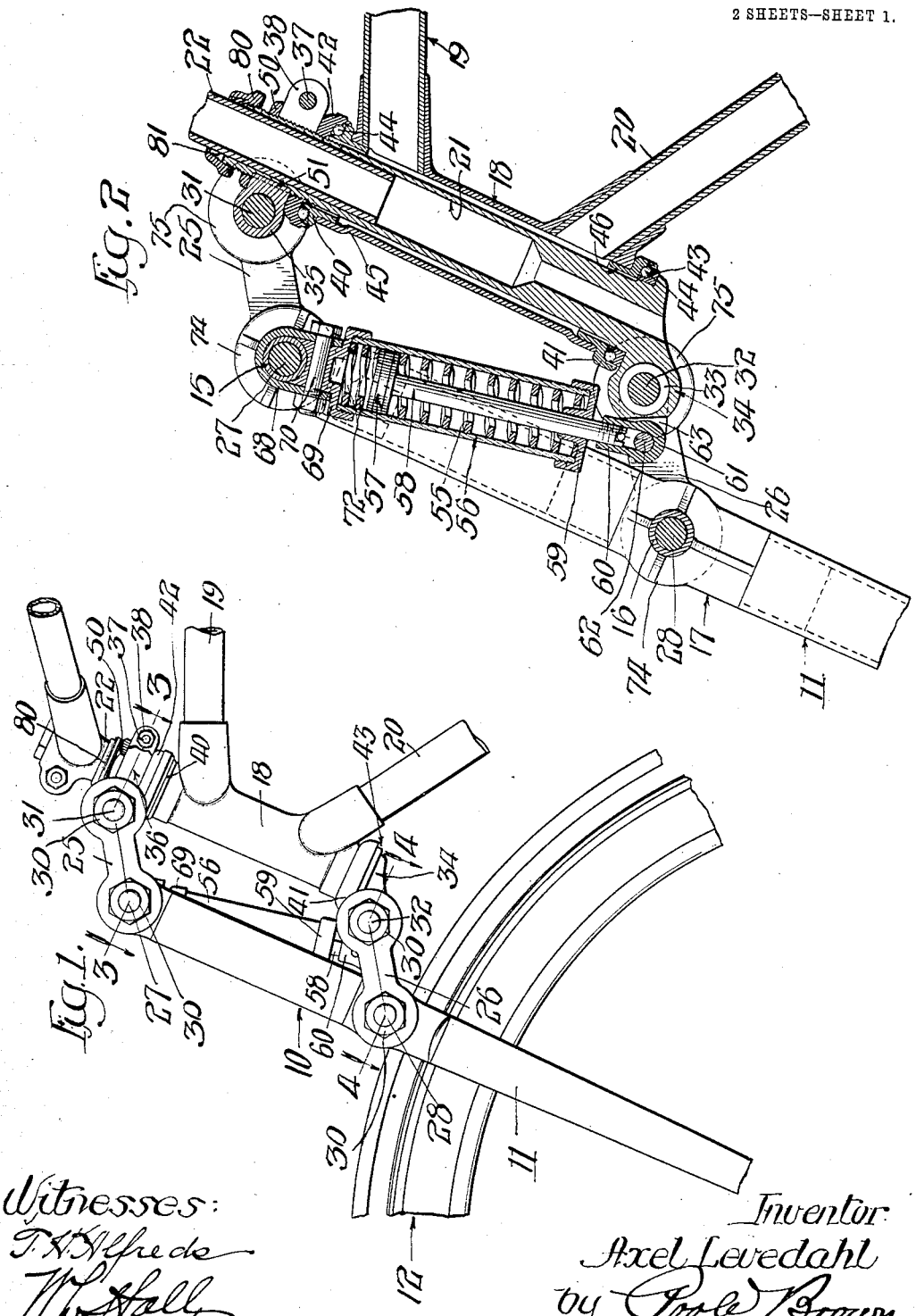

UNITED STATES PATENT OFFICE.

AXEL LEVEDAHL, OF AURORA, ILLINOIS, ASSIGNOR TO AURORA AUTOMATIC MACHINERY COMPANY, OF AURORA, ILLINOIS, A CORPORATION OF ILLINOIS.

BICYCLE-FRAME.

No. 913,961.   Specification of Letters Patent.   Patented March 2, 1909.

Application filed December 30, 1907, Serial No. 408,562.   Renewed December 12, 1908.   Serial No. 467,220.

*To all whom it may concern:*

Be it known that I, AXEL LEVEDAHL, a citizen of the United States, and a resident of Aurora, in the county of Kane and State of Illinois, have invented certain new and useful Improvements in Bicycle-Frames; and I do hereby declare that the following is a full, clear, and exact description thereof, reference being had to the accompanying drawings, and to the numerals of reference marked thereon, which form a part of this specification.

This invention relates to improvements in bicycle and motor-cycle frames and refers more specifically to an improved spring connection between the front fork and the steering head of the frame so constructed and arranged as to yieldingly transmit the load on the frame to the front fork and to cushion or absorb shocks or blows transmitted to the frame in passing over rough and uneven roadways.

The invention consists in the matters hereinafter set forth and more particularly pointed out in the appended claims.

In the drawings:—Figure 1 is a fragmentary side elevation of the forward part of a bicycle frame, showing my invention applied thereto. Fig. 2 is a central, vertical section thereof. Fig. 3 is a section, taken on line 3—3 of Fig. 1. Fig. 4 is a section, taken on line 4—4 of Fig. 1. Fig. 5 is a fragmentary section, taken on line 5—5 of Fig. 3. Fig. 6 is a detail of an antifriction bearing as seen from the line 6—6 of Fig. 3, looking in the direction indicated by the arrows. Fig. 7 is a perspective view of the upper end of the front fork spindle.

The front fork 10 of the frame comprises two lateral members 11, 11 which extend at their lower ends at the sides of the wheel 12 and are fixed rigidly together above the wheel by transverse connections. Said transverse connections consist, as herein shown, of upper and lower tubular bars 15, 16, respectively, each made an integral part of a fitting provided with lugs 17 which enter the sheet metal tubular parts of the fork members in the manner shown in Fig. 2.

18 designates the tubular steering head of the frame to which are connected, in the usual manner, the top and bottom members 19, 20, respectively, of the frame.

21 designates the fork spindle which is rotatively mounted in the steering head and 22 designates the handle bar stem which fits within and is clamped to the upper end of the fork-spindle, the latter being made hollow to receive said stem. The said fork-spindle and the surrounding steering head are located in rear of the upper end of the front fork, and the spindle is connected at points above and below the steering head 18 with the fork through the medium of flexible and yielding connections which constitute my invention and which will now be described. The said fork-spindle is disposed parallel with the upper end of the fork and is loosely connected with the fork by upper and lower pairs of vertically swinging links 25 and 26, respectively, which are pivotally connected at their front and rear ends to parts carried by the fork and fork-spindle, respectively. As herein shown, the forward ends of said upper and lower links are pivotally connected with the fork through the medium of bolts or rods 27 and 28 which extend axially through the upper and lower transverse connecting bars 15 and 16 and through pivot openings in the forward ends of the links. The links are confined in place by the heads 29 and nuts 30 of said bolts. The rear ends of said upper and lower links are in a like manner pivoted to upper and lower bolts or rods 31, 32 carried by the fork-spindle and located above and below the steering head, respectively.

The lower pivot bolt 32 extends through and is supported by a two-part sleeve 33 which is carried by the lower end of the fork-spindle. As herein shown, the fork-spindle is formed at its lower end with a horizontally widened, forwardly extending rigid arm 34 to receive said two-part sleeve. The sleeve 33 is made in two transversely divided parts to facilitate assembling it in the frame, as will be obvious from an inspection of Fig. 4. The upper pivot bolt 31 likewise extends through and is supported by a sleeve 35 which is made integral with a rearwardly directed clamping collar which directly surrounds and is fixed rigidly to the fork-spindle at a point above the steering head. Said clamping collar is clamped on the spindle by a clamping bolt 37 which extends transversely through apertured clamping lugs 38 at one side of said collar. The said fork-spindle is non-rotatively fixed in said clamping collar, as will hereinafter more fully appear. The sleeves 33 and 35 constitute spacing sleeves to maintain properly spaced the rear ends of the links. Antifriction thrust bearings are interposed between said fork-spindle and steering head at the upper and lower ends of the head, comprising upwardly and downwardly facing bearing rings 40 and 41 fitted to the upper and lower ends, respectively, of the tubular head, opposing upper and lower bearing rings 42, 43 fitted to the spindle and balls 44 occupying ball races formed between opposing bearing rings. The said upper and lower bearing rings 40 and 41 are attached to the tubular head by integral, cylindric flanges 45, 46 which fit tightly in the ends of said head. The lower spindle bearing member or ring 43 is fitted stationary to an annular, upwardly facing shoulder on the spindle, while the upper spindle bearing member is interiorly screw-threaded to engage exterior screw-threads of the upper end of the spindle. Said latter bearing ring or member constitutes means, therefore, by which both upper and lower bearings may be adjusted, it being observed that the spindle fits within the head without contact therewith except at the upper and lower bearings.

The clamping collar 36, by which the upper spacing sleeve 35 is supported from the fork-spindle, fits over the upper screw-threaded end of the fork-spindle above the upper spindle bearing ring 42, and said collar is confined between said bearing ring 42 and a nut 50 which has screw-threaded engagement with the spindle above said clamping collar. The clamping collar is provided on its inner cylindric wall with a plurality of angularly separated longitudinal ribs 51 which engage similarly arranged grooves 52 formed on the exterior surface of the screw-threaded section of the fork-spindle. Said ribs and grooves constitute an interlocking connection between the fork-spindle and collar through which rotative movement of the spindle is transmitted to the fork to turn the front or steering wheel. The clamping collar is placed upon the screw-threaded end of the spindle after the upper antifriction bearing ring 42 has been adjusted and slips loosely down over the spindle. Thereafter, the collar is clamped upon the spindle through the action of the clamping bolt 37 so as to force the ribs of the collar closely into the grooves 51 of the spindle and thereby effect a non-rotative interlocking connection between said parts. The said non-rotative clamping collar confined, as it is by the nut 50, against the screw-threaded bearing ring 42 serves as a means to lock said bearing ring from rotation, and thus prevents derangement of the upper and lower spindle bearings, the adjustment of which is effected by said nut 50.

The load carrying and shock absorbing spring device which yieldingly supports the forward portion of the frame from the upper end of the front fork, and which absorbs or cushions shocks and jars, due to the passing of the machine over rough and uneven roadways, is connected at its upper end with the upper end of the fork and at its lower end with the fork-spindle at a point below the steering head. An approved form of spring device is herein illustrated and is made as follows: 55 designates a spiral spring contained within a cylinder 56 which is connected at its upper end with the upper transverse connecting bar 15 of the fork in a manner to swing in a vertical plane towards and from the steering head. Contained within and fitted closely to the wall of said cylinder is a sliding piston 57 which is provided with a rod or stem 58 that extends downwardly through the coiled spring and an opening in the lower end wall or head 59 of said cylinder. Said piston rod is loosely connected at its lower end with the lower end of the fork-stem. As herein shown, the lower end of said piston rod 58 enters a socket piece 60 made integral with a sleeve 61 which surrounds a pin or bolt 62 that extends transversely between and through lugs 63, 63 formed integral with and extending forwardly from the fork-spindle arm 34. The upper end of said cylinder 56 is connected with the upper transverse fork bar 15 by means of a stirrup 68 which embraces said bar 15 and the side members of which are fitted to a prolongation of the upper head 69 of said cylinder and secured thereto by a bolt 70. The upper end of said prolongation of the head is formed with an upwardly opening concave recess or seat to fit the cylindric surface of said bar 15, as clearly shown in Fig. 2. Said bar 15 is provided with an annular recess 71 in which said stirrup and the recessed portion of the cylinder head fit, thus holding said parts from movement endwise of the bar. The spring 55 is made of such length that the piston normally occupies a position near the upper end of the cylinder. A short spiral spring 72 is interposed between the upper end or head of the cylinder and the piston and serves as a yielding abutment against which the piston is formed by the recoil of the main cushioning spring 55, and also serves to hold the piston firmly against said main spring, thereby avoiding lost motion and preventing rattling of the parts.

The piston fits closely within the cylinder, so as to prevent the free escape of air past the same when the piston moves downwardly in the cylinder. A close fit of the piston rod with the lower head of the cylinder is likewise provided. As a result of this construction the body of air between the piston and lower cylinder head supplements the cushioning action of the spring 55. That is to say, the confined body of air within the cylinder below the piston is compressed in the descent of the piston, so as to gradually retard its movement, and by its expansion it, to some degree, serves to aid the spring 55 in bringing the piston back to its normal position. Any leakage of the air from the cylinder around the piston or piston-rod will have substantially no effect with regard to its cushioning action, because such cushioning action will be needed only in case of sudden and severe jars coming on the front fork and in such cases the movement of the piston in the cylinder will be so quick or rapid that the air will be compressed and will exert its retarding action on the piston before it has time to escape in appreciable quantities. A very close or absolutely air-tight fit of the piston and piston-rod in the cylinder is not, therefore, essential to the production of the desired cushioning effect. Antifriction bearings are provided between the links 25 and 26 and the ends of the connecting bars of the fork and spacing sleeves and carried by the spindle as follows: The said bars and spacing sleeves are enlarged at their outer ends to form heads or flanges 74, 75. In the flat end faces of said heads are formed circular annular grooves which oppose like annular depressions formed on the inner faces of the links; the said annular grooves constituting annular ball races to receive antifriction balls 78. The nuts of the cross-bolts or rods 27, 28, 31 and 32 serves as means for confining the bearing balls in place and for adjusting the bearings. Said antifriction bearings serve to give great freedom of movement between the links and the parts to which they are pivoted.

The construction described provides a hinged connection between the parallel fork-spindle and the fork which maintains the parallel relation of said parts throughout their range of relative movement, thereby permitting ample relative movement of the parts under the control of the cushioning spring without imposing a bending or twisting stress on said parts. The said links also constitute a lateral rigid connection between the fork and fork-spindle through which is transmitted the steering movement of the spindle. The spring 55 yieldingly supports the load on the frame, the frame in rear of the fork being suspended from the lower end of the piston rod which is in turn supported on the cushioning spring 55 carried by the fork. The parallel links 25 and 26 maintain the fork and its stem in such fixed relation that the cushioning action of the spring is impressed with uniform effect on the frame, thus securing a smooth and easy action of the spring.

The fork-spindle is made tubular to receive the stem 22 of the handle bars and said stem is locked in the tubular spindle by means of a lock-nut 80 surrounding and having screw-threaded engagement with the upper end of the spindle and a split clamping ring 81 surrounding the handle stem within said nut and provided with an exterior annular wedge surface which is engaged by an interior annular wedge surface of the nut. The spindle is shown as made hollow throughout its length and the lower end of the opening therein is free or unobstructed. This arrangement permits circuit wires or other motor controlling devices to be passed down through the spindle from the hollow handle bars and thence to the motor. This arrangement is advantageous because it places such motor controlling devices in the axis of rotation of the fork spindle, thus not only concealing said devices but also largely avoiding constant bending thereof as the steering wheel is swung from side to side, such as would occur if the circuit wire or other motor controlling device be located at one side of the steering head.

I claim as my invention:—

1. In a bicycle frame, the combination with the front fork comprising two fork-members connected at their upper ends by a cross-bar, a steering head in rear of the upper end of the fork, and a fork-spindle rotatively mounted in the steering head, of links loosely connected at their rear ends with the fork-spindle at points above and below the steering head and loosely connected at their forward ends with the fork, and a spring cushioning device connected at its upper end with the fork cross-bar and at its lower end with the fork-spindle at a point below the steering head.

2. In a bicycle frame, the combination with the front fork comprising two fork-members connected at their upper ends by upper and lower connecting bars, a steering head in rear of the upper end of the fork, and a fork-spindle rotatively mounted in the steering head, of upper and lower pivot bolts carried by said spindle above and below the steering head, pivot bolts carried by said fork connecting bars, upper and lower pairs of vertically swinging links pivoted to said fork and spindle, and a spring device carried by the upper connecting bar of the fork and pivotally connected at its lower end with the fork-spindle.

3. In a bicycle frame, the combination with the front fork comprising two fork-members connected at their upper ends by upper and lower connecting bars, a steering head in rear of the upper end of the fork, and a fork-spindle rotatively mounted in the steering head, of upper and lower pivot bolts carried by said spindle above and below the steering head, pivot bolts carried by said fork connecting bars, upper and lower pairs of vertically swinging links pivoted to said fork and spindle, and spacing sleeves carried by the spindle and surrounding said spindle pivot bolts.

4. In a bicycle frame, the combination with the front fork comprising two fork-members connected at their upper ends by upper and lower connecting bars, a steering head in rear of the upper end of the fork, and a fork-spindle rotatively mounted in the steering head, of upper and lower pivot bolts carried by said spindle above and below the steering head, pivot bolts carried by said fork connecting bars, upper and lower pairs of vertically swinging links pivoted to said fork and spindle, spacing sleeves carried by the spindle and surrounding said spindle pivot bolts, and antifriction bearings between the lateral faces of the links and the spacing sleeves and fork connecting bars.

5. In a bicycle frame, the combination with the front fork comprising two fork-members connected at their upper ends by upper and lower tubular connecting bars, a steering head in rear of the upper end of the fork, and a fork-spindle rotatively mounted in the steering head, of upper and lower pivot bolts carried by said spindle above and below the steering head, pivot bolts extending through and supported in the tubular connecting bars of the fork, upper and lower pairs of vertically swinging links loosely connecting the pivot bolts of the fork and fork-spindle, spacing sleeves surrounding the spindle pivot bolts, the inner sides of said links and the ends of the spacing sleeves and connecting bars being provided with registering annular grooves to form ball-races, antifriction balls in said ball-races and means affording yielding connection between the fork and spindle.

6. In a bicycle frame, the combination with the front fork comprising two fork-members connected at their upper ends by upper and lower tubular connecting bars, a steering head in rear of the upper end of the fork, and a fork-spindle rotatively mounted in the steering head, of upper and lower pivot bolts carried by said spindle above and below the steering head, pivot bolts extending through and supported in the tubular connecting bars of the fork, upper and lower pairs of vertically swinging links loosely connecting the pivot bolts of the fork and fork-spindle, spacing sleeves surrounding the spindle pivot bolts, the inner sides of said links and the ends of the spacing sleeves and connecting bars being provided with registering annular grooves to form ball-races, antifriction balls in said ball-races, nuts on the bolts for confining the links and their antifriction bearings in place, and means affording yielding connection between the fork and spindle.

7. In a bicycle frame, the combination with the front fork thereof, a steering head mounted in rear of the upper end of the fork, and a fork-spindle rotatively mounted in said steering head, said spindle being provided at its lower end with a forwardly directed arm, of a transversely arranged sleeve mounted in said arm, a second transverse sleeve mounted on said spindle above the steering head, bolts extending through and supported in said upper and lower sleeves, upper and lower pairs of links pivoted at their rear ends to said bolts and at their forward ends to parts carried by the upper end of the fork, and a cushioning spring device affording yielding connection between the upper end of the fork and said rigid arm of the fork-spindle.

8. In a bicycle frame, the combination with the front fork thereof, a steering head mounted in rear of the upper end of the fork, and a fork-spindle rotatively mounted in said steering head, said spindle being provided at its lower end with a forwardly directed arm, of a transversely arranged sleeve mounted in said arm, a second transverse sleeve mounted on said spindle above the steering head, bolts extending through and supported in said upper and lower sleeves, upper and lower pairs of links pivoted at their rear ends to said bolts and at their forward ends to parts carried by the upper end of the fork, said lower sleeve of the spindle being made of two parts and the arm of said spindle being provided with a transverse opening into the opposite ends of which the parts of the sleeve are inserted and fixed, and a cushioning spring device affording yielding connection between the upper end of the fork and said rigid arm of the fork-spindle.

9. In a bicycle frame, the combination with the front fork thereof, a steering head arranged in rear of the upper end of said fork, and a fork-spindle rotatively mounted in the steering head, of upper and lower pairs of links connecting the fork-spindle, at points above and below the steering head, with the upper end of the fork, the connections between the rear ends of said links and the spindle comprising transversely arranged pivot bolts carried by the spindle, the upper one of which is contained within a sleeve which extends between the upper pairs of links, and a collar integral with said upper sleeve which embraces the fork-spindle above the steering head and is fixed thereon, and means affording yielding connection between the upper end of the fork and said fork-spindle.

10. In a bicycle frame, the combination with the front fork thereof, a steering head arranged in rear of the upper end of said fork, and a fork-spindle rotatively mounted in the steering head, of upper and lower pairs of links connecting the fork-spindle, at points above and below the steering head with the upper end of the fork, the connections between the rear ends of said links and the spindle comprising transversely arranged pivot bolts carried by the spindle, the upper one of which is contained within a sleeve which extends between the upper pairs of links, and a collar integral with said upper sleeve which embraces the fork-spindle above the steering head and is fixed thereon, interfitting non-rotative connections between the collar and spindle, and means affording yielding connection between the upper end of the fork and said fork-spindle.

11. In a bicycle frame, the combination with the front fork thereof, a steering head arranged in rear of the upper end of said fork, and a fork-spindle rotatively mounted in the steering head, of upper and lower pairs of links connecting the fork-spindle, at points above and below the steering head with the upper end of the fork, the connections between the rear ends of said links and the spindle comprising transversely arranged pivot bolts carried by the spindle, the upper one of which is contained within a sleeve which extends between the upper links, a collar integral with said upper sleeve which embraces the fork-spindle above the steering head, ball bearings between the upper and lower ends of the steering head and said fork-spindle, the bearing at the top of the head comprising an upper bearing member which has screw-threaded engagement with the spindle and arranged to adjust both upper and lower bearings, said upper sleeve attaching collar engaging said upper bearing ring, a nut having screw-threaded engagement with the spindle above said collar and between which and said upper bearing ring the collar is confined, and a spring affording a yielding connection between the upper end of the fork and the lower end of the spindle.

12. In a bicycle frame, the combination with the front fork thereof, a steering head arranged in rear of the upper end of said fork, and a fork-spindle rotatively mounted in the steering head, of upper and lower pairs of links connecting the fork-spindle, at points above and below the steering head with the upper end of the fork, the connections between the rear ends of said links and the spindle comprising transversely arranged pivot bolts carried by the spindle, the upper one of which is contained within a sleeve which extends between the upper links, a collar integral with said upper sleeve which embraces the fork-spindle above the steering head, antifriction bearings between the upper and lower ends of said steering head and spindle comprising upper and lower facing bearing rings fitted to the ends of the head, balls interposed between the lower bearing ring and a fixed annular bearing surface on the spindle below the head, a bearing ring having screw-threaded engagement with the upper end of the spindle and opposing the upper steering head bearing ring, balls interposed between said upper bearing rings, said upper sleeve attaching collar being capable of sliding endwise on the screw-threaded upper end of the spindle but held non-rotatively thereon, a nut having screw-threaded engagement with said spindle above said collar and arranged to confine the collar between the same and the upper screw-threaded ring of the upper antifriction bearing, and a spring affording yielding connection between the upper end of the fork and said spindle.

13. In a bicycle frame, the combination with a steering head and a fork-spindle rotatively mounted therein, and antifriction bearings interposed between the upper and lower ends of the head and said spindle, the bearing at the top of the head embracing an upper bearing ring which has screw-threaded engagement with the spindle above the steering head and is arranged to adjust both the upper and lower bearings, of upper and lower transversely arranged pivot bolts carried by the spindle, one above and the other below the head, a sleeve surrounding the upper pivot bolt and provided with an integral collar which encircles the screw-threaded upper end of the spindle, a nut having screw-threaded engagement with said spindle above said sleeve and between which and the screw-threaded bearing ring of the upper bearing said sleeve is confined, said sleeve being movable endwise of the spindle but interlocked to prevent rotation thereon.

In testimony that I claim the foregoing as my invention I affix my signature in the presence of two witnesses, this 21st day of December A. D. 1907.

AXEL LEVEDAHL.

Witnesses:
E. D. GRAY,
O. HAMMERLUND.